United States Patent [19]
Yamasaki et al.

[11] Patent Number: 4,600,267
[45] Date of Patent: Jul. 15, 1986

[54] OPTICAL DISTRIBUTOR

[75] Inventors: Tetsuya Yamasaki, Amagasaki; Takashi Kishimoto; Ichirou Yamauchi, both of Nishinomiya, all of Japan

[73] Assignee: Nippon Sheet Glass Co., Ltd., Osaka, Japan

[21] Appl. No.: 696,660

[22] Filed: Jan. 31, 1985

Related U.S. Application Data

[63] Continuation of Ser. No. 346,754, Feb. 8, 1982, abandoned.

[30] Foreign Application Priority Data

Feb. 12, 1981 [JP] Japan ................................. 56-19259

[51] Int. Cl.⁴ ............................. G02B 6/26; G02B 6/32
[52] U.S. Cl. .............................. 350/96.15; 350/96.16; 350/96.18; 350/96.19
[58] Field of Search ............... 350/96.15, 96.16, 96.18, 350/96.19, 96.21

[56] References Cited

U.S. PATENT DOCUMENTS 4,148,556  4/1979  Sauter et al. ................... 350/96.13
4,213,677  7/1980  Sugimoto et al. .............. 350/96.18
4,362,359  12/1982 Dammann et al. ............. 350/96.19
4,381,137  4/1983  Berg et al. ...................... 350/96.18
4,472,797  9/1984  Nicia .............................. 350/96.19
4,474,424  10/1984 Wagner ........................... 350/96.16

Primary Examiner—William L. Sikes
Assistant Examiner—Frank Gonzalez
Attorney, Agent, or Firm—Woodcock Washburn Kurtz Mackiewicz & Norris

[57] ABSTRACT

An optical directional coupler of the invention has a first surface which is formed at the one end of a first or second graded index type light transmission body and which is perpendicular to the optical axis of the light transmission body, and also has a plurality of second surfaces which are formed at parts of the one end of the light transmission body which are different from the first surface. The light which is transmitted from a first optical fiber through the first surface is further transmitted through the second light transmission body, and then becomes incident on a second optical fiber. The light which is transmitted from the first optical fiber through the second surfaces is further transmitted through the second light transmission body and then becomes incident on a plurality of third optical fibers.

23 Claims, 7 Drawing Figures

OPTICAL DISTRIBUTOR

This is a continuation of application Ser. No. 346,754, filed Feb. 8, 1982, now abandoned.

BACKGROUND OF THE INVENTION

1. Field of the Invention

The present invention relates to an optical distributor which transmits light from a single optical fiber to a plurality of other optical fibers and which is suitably adapted for an optical fiber communication system.

2. Description of the Prior Art

Optical fiber communication has been put into practice owing to recent achievements in low loss of optical fiber and long service life of semiconductor laser. An optical fiber communication system requires an optical distributor or an optical directional coupler for transmitting light signals from an optical fiber to a plurality of other optical fibers. Especially in a data bus, a computer link or the like, it is necessary to sequentially transmit light signals received from a key station to a plurality of substations or to transmit the light signals received from these substations to other substations.

A two-branch type optical distributor is conventionally proposed which has a pair of lenses. The first lens converts light received from the optical fiber for an input side trunk line into parallel beams. Using a filter of a multilayered dielectric membrane, these parallel beams are transmitted to an optical fiber for transmitted light and an optical fiber for reflected light, so that the ratio of a quantity of light of the transmitted light to that of the reflected light may be constant. Another optical distributor is also proposed which equally transmits light received from an input side optical fiber to a plurality of output side optical fibers. In the former system, the input light is divided only into two parts, and the division number is too small. In the latter system, since the input signal is equally divided, the light from the trunk line cannot be transmitted to the next stage. Therefore, the latter system is not suitable for an optical fiber communication system in a computer link.

SUMMARY OF THE INVENTION

It is an object of the present invention to provide an optical distributor for an optical fiber, which is capable of transmitting input light to a trunk line and a plurality of substations.

It is another object of the present invention to provide an optical distributor for an optical fiber which causes small loss of light to be transmitted.

It is still another object of the present invention to provide an optical distributor which is easy to assemble.

In accordance with an aspect of this invention, an optical distributor has first and second graded index type (graded refractive index type) light transmission bodies, lengths of which are respectively substantially equal to odd number times of $\frac{1}{4}$ the periodical pitch of light. One end of the first light transmission body is opposed to one end of the second light transmission body with their optical axes aligned to each other. The optical distributor of this invention further has a first surface which is formed at the one end of a selected one of said first and second light transmission bodies and which is substantially perpendicular to the optical axis of the selected light transmission body; and a plurality of second surfaces which are formed at parts, of the one end of the selected light transmission body, which are different from said first surface, the second surfaces being inclined at a predetermined angle, preferably 3° to 20° and more preferably 4° to 6° with respect to the first surface. In the optical distributor of the present invention, a single first optical fiber is opposed to the other end of the first light transmission body in such a manner that the optical axis of the first otical fiber may be aligned with the optical axis of the first light transmission body. Among the light which is transmitted to the first light transmission body from the first optical fiber, the light which is transmitted through the first surface is transmitted through the second light transmission body and then becomes incident on a second optical fiber, one end of which is opposed to the other end of the second light transmission body. Among the light which is transmitted to the first light transmission body from the first optical fiber, the light which is transmitted through the second surfaces is transmitted through the second light transmission body and then becomes incident on a plurality of third optical fibers, one end each of which is opposed to a predetermined portion of the second light transmission body. If the length of the second light transmission body is substantially equal to $\frac{1}{4}$ the periodical pitch of light, the predetermined portion as mentioned above is the other end of the second light transmission body. However, if the length of the second light transmission body is $\frac{3}{4}$ the periodical pitch, the predetermined portion as described above may be part of the outer circumferential surface of the second light transmission body which is spaced apart from the one end of the second light transmission body by a distance corresponding to $\frac{1}{4}$ the periodical pitch.

The above, and other objects, features and advantages of the invention, will be apparent in the following detailed description of illustrative embodiments of the invention which is to be read in connection with the accompanying drawings wherein the same reference numerals are used to identify the same parts in the several views.

DETAILED DESCRIPTION OF THE PREFERRED EMBODIMENTS

Figure 1:
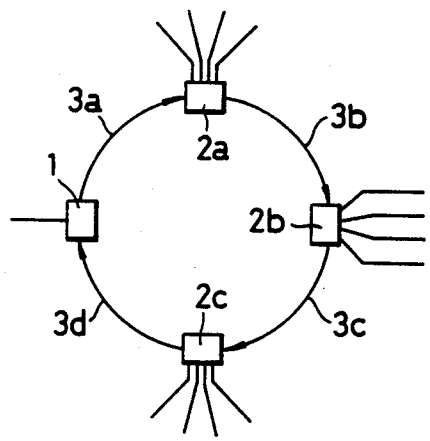
FIG. 1 is a block diagram showing an example of a conventional computer link.

FIG. 1 shows an example of a conventional computer link. In this computer link, a light signal $3a$ is supplied from a key station 1 to a substation $2a$ at a certain distance therefrom. This light signal $3a$ is separated into a trunk line signal $3b$ and branch signals. The trunk line signal $3b$ is supplied to another substation $2b$ which is at a certain distance from the substation $2a$. The branch signals are supplied to a plurality of substations associated with the substation $2a$. In the substations $2b$ and $2c$, the input signals are similarly transmitted into trunk line signals 3c and 3d and branch signals. The trunk line signal 3d is returned to the key station 1.

When an optical fiber communication system is adopted in the computer link as shown in FIG. 1, optical directional couplers are required for transmitting the light signals to associated substations at the respective substations 2a to 2c.

Figure 2:
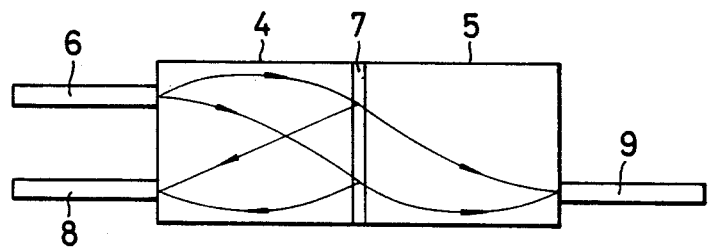
FIG. 2 is a front view showing an example of a known optical directional coupler.

FIG. 2 shows an example of a conventional optical directional coupler of this type.

The optical directional coupler shown in FIG. 2 has a pair of focusing light transmission bodies or focusing lenses 4 and 5. Light received from an input side optical fiber 6 is converted into parallel beams by the first lens 4. Between these lenses 4 and 5 is interposed a filter 7 comprising a multilayered dielectric membrane. The parallel beams output by the first lens 4 are separated into reflected light and transmitted light by this filter 7. The reflected light is output through a reflected light optical fiber 8, while the transmitted light is output through a transmitted light optical fiber 9.

However, in the optical directional coupler of this type, light is separated into two parts. Therefore, if it is desired to transmit the light signal to a number of substations at each of substations 2a to 2c, it is necessary to incorporate a corresponding number of optical directional couplers.

According to an optical directional coupler according to an embodiment of the present invention shown in FIGS. 3 to 6, the light signal can be transmitted to a number of substations by incorporating a signal optical distributor or optical directional coupler.

The optical directional coupler of this embodiment comprises a single input side optical fiber 11, a pair of focusing light transmission bodies or focusing lenses 12 and 13, and output side optical fibers 14, 15, 16, 17 and 18. The lengths of the lenses 12 and 13 are respectively set to correspond to ¼ the periodical pitch of light which sinusoidally passes through the lenses. One end (flat surface) of the first lens 12 is opposed at a suitable distance to one end of the second lens 13 in such a manner that optical axes thereof are aligned to each other. The optical fiber 11 is coupled to the other end of the first lens 12 so that their optical axes are aligned. A flat surface 19 is formed at the center of the one end of the second lens 13 (opposing the one end of the first lens 12) so as to be perpendicular to the optical axis of the second lens 13. Four flat surfaces 20, 21, 22 and 23 are formed around the flat surface 19 at equal angular intervals of about 90° and are inclined with respect to the flat surface 19. These five surfaces 19 to 23 define a portion which projects from the front end of the second lens 13. Five optical fibers 14 to 18 are coupled to the other end (flat surface) of the second lens 13 in correspondence with these five surfaces 19 to 23. Among these five optical fibers 14 to 18, the central optical fiber 14 has an optical axis which is aligned with that of the second lens 13, and defines a trunk line optical fiber. The remaining optical fibers 15 to 18 which are arranged at equal angular intervals and at a substantially equal distance from the central axis of the second lens 13 define branch optical fibers.

In the optical directional coupler of this construction, light received from the input side optical fiber 11 is converted into substantially parallel beams at the output end of the first lens 12. These parallel beams become incident on the input end (plane of incidence) of the second lens 13 which has a length corresponding to ¼ the periodical pitch of light. The central portion, that is, the portion near the optical axis, of the input end surface of the lens 13 is the flat surface 19 which is perpendicular to the optical axis of the second lens 13. Therefore, the parallel beams which become incident on the second lens 13 are focused to form a spot on the point on the optical axis of the lens 13 and also on the output end face. The focused light thus becomes incident on the trunk line optical fiber 14. Meanwhile, parallel beams which are incident on the four surfaces 20 to 23 which are inclined at an equal angle $\phi_1$ with respect to the flat surface 19 are refracted and divided into four parts. These light beams form four spots at the parts of the output end face of the second lens 13 which are at predetermined distances from the optical axis of the second lens 13 and are transmitted to the branch optical fibers 15 to 18.

The first and second lenses 12 and 13 of the optical directional coupler of the present invention are made of a transparent material such as glass. A refractive index n(r) of the transparent material at a point at a distance corresponding to radius r from the optical axis in a vertical section of the lens gradually parabolically decreases substantially in accordance with the following relation as the radius r increases:

$$n(r) = n_0(1 - \tfrac{1}{2}Ar^2) \tag{1}$$

where $n_0$ is the refractive index on the optical axis and A is the refractive index distribution constant of the first and second lenses 12 and 13. If the distance of the position of the lens at which light becomes incident from the optical axis thereof is $r_1$, the angle of incidence is $\theta_1$, the distance of the light-projecting position from the optical axis is $r_2$, the light-projecting angle is $\theta_2$, and the length of the lens is L, relations given below are established:

$$r_2 = r_1 \cos(\sqrt{A}\,L) + \frac{\theta_1}{n_0\sqrt{A}} \sin(\sqrt{A}\,L) \tag{2}$$

$$\theta_2 = -n_0\sqrt{A}\, r_1 \sin(\sqrt{A}\,L) + \theta_1 \cos(\sqrt{A}\,L) \tag{3}$$

The length of a lens which allows projection of light at the same position and angle as those of incident light, that is, the periodical pitch of the light $L_0$ may be given by the following relation from relations (1) and (2) above:

$$L_0 = 2\pi/\sqrt{A} \tag{4}$$

If $r_1=0$ (light is incident on the optical axis at the front end of the lens at an angle of $\theta_1$) is substituted into relations (2) and (3), $r_2=0$ and $\theta_2=-\theta_1$ when the length of the lens is $\tfrac{1}{2}L_0$, that is, $\tfrac{1}{2}$ the pitch. Then, the light is output from the optical axis at the other end of the lens at an angle of $-\theta_1$.

Figure 4:
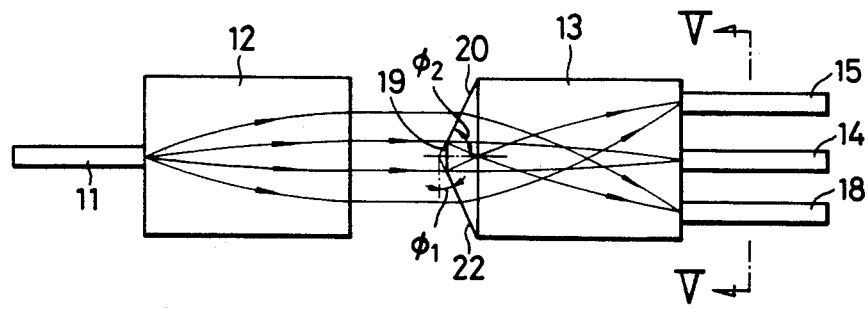
FIG. 4 is a schematic front view of the optical directional coupler shown in FIG. 3.
Figure 5:
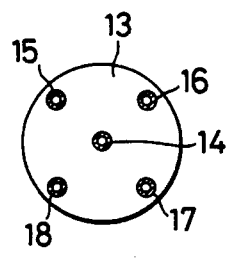
FIG. 5 is a sectional view of the optical directional coupler shown in FIG. 4 along the line V—V thereof.

If the length of the lens is $\tfrac{1}{2}$ the periodical pitch, when the light in the spot form is received at one end of the lens as the output from the optical fiber, the light is returned to a spot same as the original spot. If the length of the lens is, on the other hand, ¼ the pitch, when the spot output from the optical fiber becomes incident on one end of the lens, the light is output from the other end of the lens in the form of substantially parallel beams. If the second lens 13 of a length corresponding to ¼ the pitch is opposed to the first lens 12 of the same length in such a manner that their axes are aligned with each other, the spot light output from the optical fiber 11 is converted into the parallel beams by the lens 12. The parallel beams are then returned to the spot light at the output end of the second lens 13. If the input end face of the second lens 13 having a length corresponding to ¼ the pitch is divided into a plurality of surfaces 19 to 23, light propagates in a plurality of directions as shown in FIG. 4. Thus, light is focused into spots at a plurality of positions of the output end of the second lens 13.

If the angle of the surfaces 20 to 23 with respect to the optical axis is $$\phi_2 \left( = \frac{\pi}{2} - \phi_1 \right),$$

the distance $r_2$ of the spot from the optical axis of the second lens 13 is expressed by equation below:

$$r_2 = (\pi/2 - \phi_2)/n_0 \sqrt{A} \tag{5}$$

If a standard lens of 1.8 mm diameter is selected, $n_0$ is 1.602 and $\sqrt{A}$ is 0.319 mm$^{-1}$. The length corresponding to ¼ the periodical pitch of light, in this case, is 4.9 mm from relation (4). If the distance $r_2$ of the optical fibers 15 to 18 from the optical axis of the second lens 13 is, for example, 0.5 mm, the angle $\phi_2$ of the surfaces 20 to 23 with respect to the optical axis may be obtained as 1.314 rad, about 75° from equation (5) above. Thus, the angle $\phi_1$ of the surfaces 20 to 23 with respect to the surface 19 is about 15°.

The diameter of the optical fibers 14 to 18 is about 125μ (core) excluding the thin clad. These optical fibers 14 to 18 are preferably bundled at a high density. The lengths of the first and second lenses 12 and 13 are preferably about ¼ the periodical pitch of light. For this reason, the angle $\phi_1$ is, in practice, preferably 3° or more and more preferably 4° or more. If the angle $\phi_1$ is less than 3°, the optical fibers 14 to 18 of unnecessarily small diameter must be used. On the other hand, the angle $\phi_1$ is, in practice, preferably 20° or less and more preferably 6° or less. If the angle $\phi_1$ exceeds 20°, the fibers cannot be bundled at a high density. Moreover, the input ends of the branch optical fibers 15 to 18 then must be arranged at positions significantly spaced apart from the optical axis of the second lens 13. This results in a great aberration of the light which becomes incident on the input ends of these optical fibers. When this happens, clear spots of light which are well aligned with the optical axes of these optical fibers 15 to 18 are no longer formed, so that excellent optical directional coupling may not be performed. The area of the flat surface 19 corresponding to the trunk line optical fiber 14 is determined according to the coupling ratio, while considering the diameter and the power density of the parallel beams output from the second lens 13.

The flat surface 19 formed at the center of the input end of the second lens 13 is perpendicular to the optical axis thereof. The flat surfaces 20 to 23 formed to surround this flat surface 19 are symmetrical about the optical axis of the second lens 13. These surfaces may therefore be formed by optically abrading one flat end face of the second lens 13 to form mirror surfaces. Alternatively, the second lens 13 with such flat surfaces may be formed by adhering a transparent body of glass or synthetic resin with such polygonal surface structure to the end of a cylindrical focusing lens, this end being perpendicular to the optical axis thereof. It is therefore possible to render the function of focusing only to the cylindrical portion (except the projected portion at the front end) of the second lens 13 shown in FIG. 3. It is also possible to apply a non-reflective coating on the flat surfaces 19 to 23 at the input end of the second lens 13 thereby reducing the reflection loss.

The outer diameters of the optical fibers 14 to 18 are so selected that the optical fibers 15 to 18 with the optical fiber 14 at the center may be densely bundled to be contiguous with each other. The angle $\theta_2$ of the flat surfaces 20 to 23 with respect to the optical axis of the second lens 13 is so selected that the parallel beams output from the first lens 12 may become equally incident on the cores of the optical fibers 15 to 18. When the angle $\phi_2$ is selected in this manner, it is easy to rotate the optical fibers 15 to 18 about the optical axes relative to a mount sleeve (not shown) and to fix them at the optimal positions while monitoring the amount of light obtained therefrom. Even if $r_2$ is 0.5 mm, the angle $\phi_2$ of the flat surfaces 20 to 23 with respect to the optical axis of the second lens 13 is 75° which is substantially a right angle. If the angle $\phi_2$ is about this value, the lengths of the second lens 13 at the center and periphery are almost equal to ¼ the periodical pitch of light, and the difference therebetween may be negligible. Therefore, this does not present any problem to the focusing property of the second lens 13.

In the optical directional coupler as described above, light is focused to the cores of the respective optical fibers 14 to 18 and does not substantially leak to the clads or to the outside. The optical directional coupler as described above can achieve an extremely small loss, is small in the number of components involved, is relatively easy to assemble, and is inexpensive to manufacture.

Figure 6:
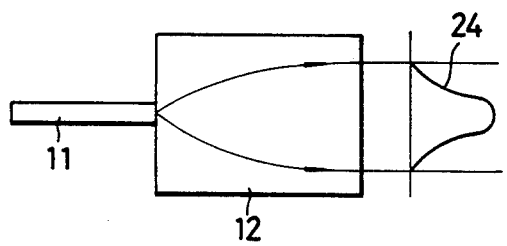
FIG. 6 is a front view of the first lens for explanation of the distribution of light intensity at the output end of the first lens shown in FIG. 3.

In the optical directional coupler described above, the distribution of the light intensity at the output end of the first lens 12 is represented by a curve in FIG. 6. This curve substantially corresponds to the Gaussian curve; the intensity becomes maximum at the optical axis and gradually decreases radially outwardly from the optical axis. Therefore, even if the area of the respective flat surfaces 19 and 20 to 23 is the same, the intensity of the light supplied to the trunk line optical fiber 14 may be made sufficiently great as compared to that of the light supplied to the branch optical fibers 15 to 18, respectively. Furthermore, it is also possible to vary the ratio of the light intensities by changing the ratio of areas of the flat surfaces 19 and the flat surfaces 20 to 23.

Figure 3:
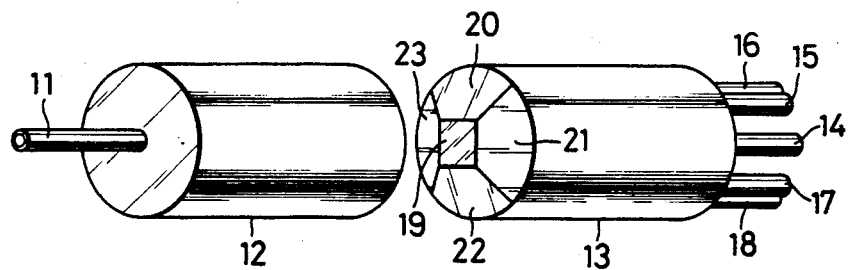
FIG. 3 is a schematic perspective view of an optical directional coupler according to the present invention.
Figure 7:
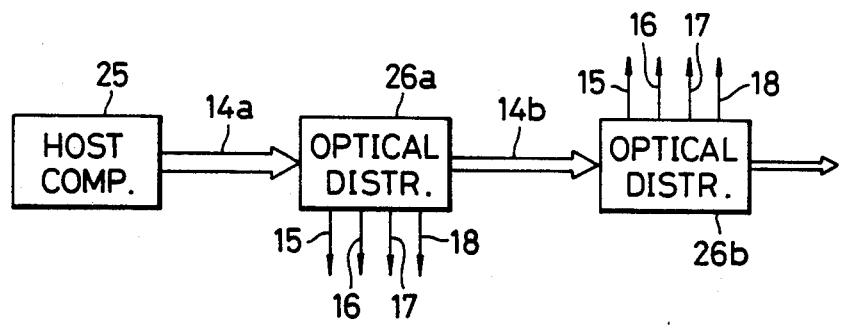
FIG. 7 is a block diagram of a computer network using the optical directional coupler shown in FIG. 3.

For the reasons described above, the optical directional coupler of the present invention is suitable for a computer network such as a computer link. As shown in FIG. 7, a light signal from a host computer 25 is supplied to an optical directional coupler 26a through a trunk line optical fiber 14a of the configuration as shown in FIG. 3. The optical directional coupler 26a transmits the light signal of a predetermined level to another optical directional coupler 26b of similar configuration through another trunk line optical fiber 14b while it transmits the light signal to the branch optical fibers 15 to 18. Therefore, an amplifier need not be incorporated into the system even if the light signal is transmitted through a plurality of trunk line optical fibers. Furthermore, taking an advantage of the optical fiber communication, it is possible to transmit data signals and control signals parallel to each other, so that the optical fiber communication system may be made simple in construction.

Although the present invention has been described with reference to its particular embodiment, the present invention is not limited to this. Various changes and modifications therefore may be made within the spirit and scope of the present invention. For example, in the embodiment described above, one trunk line optical fiber 14 was used while four branch optical fibers 15 to 18 are used for transmitting the input light signal into four optical members. The light signal may therefore be transmitted to any number of optical fibers (2 or more).

In the embodiment described above, the first and second lenses 12 and 13 have a length corresponding to ¼ the periodical pitch of light. However, the lenses may have a length slightly smaller than ¼ the pitch. In this case, the optical fiber 11 and the first lens 12 are opposed to each other with a small distance therebetween. Alternatively, the optical fibers 14 to 18 and the second lens 13 may be opposed to each other with a small distance therebetween. Since the first and second leses 12 and 13 have the beam period expressed by equations (2) and (3) above, the lenses 12 and 13 may have a length substantially corresponding to an odd number times of ¼ the pitch, such as ¾ the pitch or 5/4 the pitch.

Although, in the above-mentioned embodiment, the flat surface 19 and the flat surfaces 20 to 23 are formed at the front end portion of the second lens 13, they may be formed at the rear end portion of the first lens 12. However, when the first and second lenses comprise a transparent material or materials in which its refractive index n(r) decreases in accordance with the increase of a distance r corresponding to radius from the optical axis in a vertical section of the lens, the flat surfaces may form a recess, whose shape corresponds substantially to that of the projected portion formed by the flat surfaces 19 to 23 indicated in FIG. 3, at the rear end portion of the first lens.

Although illustrative embodiments of the invention have been described in detail herein with reference to the accompanying drawings, it is to be understood that the invention is not limited to such precise embodiments, and that various changes and modifications may be effected therein by one skilled in the art without departing from the scope or spirit of the invention as defined in the appended claims.

What is claimed is:

1. An optical distributor for transmitting light received from a single first optical fiber to a second optical fiber and to a plurality of third optical fibers, comprising:
    first and second graded index type light transmission bodies, the lengths of which are respectively substantially equal to an odd number times ¼ the periodical pitch of light, one end of said first light transmission body being opposed to one end of said second light transmission body so that optical axes thereof may be aligned with each other, and one end of said first optical fiber being opposed to the other end of said first light transmission body so that optical axes thereof may be aligned with each other;
    a first surface which is formed at said one end of a selected one of said first and second light transmission bodies and which is substantially perpendicular to the optical axis of said selected light transmission body; and
    a plurality of second surfaces which are formed at parts of said one end of said selected light transmission body which are different from said first surface, said second surfaces being inclined at a predetermined angle with respect to said first surface, one end of said second optical fiber being opposed to the other end of said second light transmission body so as to receive light which is transmitted from said first surface, and one end of each of said plurality of third optical fibers being opposed to predetermined portions, respectively, of said second light transmission body so as to receive graded index type light which is transmitted from said second surfaces.

2. An optical distributor according to claim 1, wherein said first and second graded index type light transmission bodies are made of a transparent material having a refractive index which gradually parabolically decreases radially outwardly from the optical axes thereof.

3. An optical distributor according to claim 2, wherein the lengths of said first and second graded index type light transmission bodies are respectively substantially equal to ¼ the periodical pitch of light.

4. An optical distributor according to claim 1, wherein said first surface and said plurality of second surfaces are formed at said one end of said second graded index type light transmission body to define a projected portion at said one end thereof.

5. An optical distributor according to claim 4, wherein said first surface is formed at a central portion of said one end of said second graded index type light transmission body, and said plurality of second surfaces are formed at parts of said one end adjacent to said central portion, said plurality of second surfaces being adjacent to each other and arranged at equal angular intervals about said first surface.

6. An optical distributor according to claim 5, wherein said first and second surfaces are flat.

7. An optical distributor according to claim 6, wherein said one end of said first graded index type light transmission body includes a flat surface which is perpendicular to the optical axis thereof.

8. An optical distributor according to claim 7, wherein there is a gap between said one end of said first graded index type light transmission body and said one end of said second graded index type light transmission body.

9. An optical distributor according to claim 8, wherein said predetermined angle is between 3° and 20°.

10. An optical distributor according to claim 8, wherein said predetermined angle is between 4° and 6°.

11. An optical distributor according to claim 8, wherein said one end of said first optical fiber is joined to said other end of said first graded index type light transmission body.

12. An optical distributor according to claim 11, wherein said predetermined portions are at said other end of said second graded index type light transmission body.

13. An optical distributor according to claim 12, wherein said one end of said second and third optical fibers are joined to said other end of said second graded index type light transmission body.

14. An optical distributor for transmitting light received from a first optical fiber to a second optical fiber and to a plurality of third optical fibers, comprising:

first and second graded index type light transmission bodies, the lengths of which are respectively substantially equal to an odd number times ¼ the periodical pitch of light passing through the bodies, one end of said first graded index type light transmission body being opposed to one end of said second graded index type light transmission body so that an optical axis of each is aligned with an optical axis of the other, and one end of said first optical fiber being opposed to the other end of said first graded index type light transmission body so that an optical axis of the first optical fiber is aligned with the optical axis of the first graded index type light transmission body, said first graded index type light transmission body receiving said light from said first optical fiber and transmitting said light to said second graded index type light transmission body;

a first surface which is formed at said one end of a selected one of said first and second graded index type light transmission bodies and which is substantially perpendicular to the optical axis of said selected graded index type light transmission body; and a plurality of second surfaces which are formed at remaining parts of said one end of said selected graded index type light transmission body different from said first surface, each of said second surfaces being inclined with respect to said first surface, a portion of said light being transmitted through said first surface and through said second graded index type light transmission body to one predetermined surface portion of said second graded type light transmission body, said second surfaces refracting and dividing into parts the remainder of said light being transmitted through the optical distributor from said first optical fiber, and each part of the light being refracted and divided by a different one of said second surfaces being transmitted through that second surface and through said second graded index type light transmission body to a different, predetermined surface portion of said second graded index type light transmission body;

one end of said second optical fiber being opposed to the one predetermined surface portion of said second graded index type light transmission body and receiving said portion of said light which is transmitted through said first surface and one end of each of said plurality of third optical fibers being opposed to a different one of said different, predetermined surface portions of said second graded index type light transmission body and receiving one of said parts of the light being transmitted through a different one of said plurality of second surfaces.

15. An optical distributor according to claim 14, wherein each of said first and second graded index type light transmission bodies is made of a transparent material having a refractive index which decreases parabolically radially outwardly from the optical axis of each graded index type light transmission body.

16. An optical distributor according to claim 15 wherein said first surface and said plurality of second surfaces are formed at said one end of said second graded index type light transmission body to define a projected portion at said one end thereof.

17. An optical distributor according to claim 16 wherein said first surface is formed at said one end of said second graded index type light transmission body centered around the optical axis thereof and said plurality of second surfaces are formed at remaining parts of said one end of said second light transmission body adjacent to said first surface, said plurality of second surfaces being adjacent to each other formed at equal angular intervals around said first surface.

18. An optical distributor according to claim 17, wherein said first surface and said plurality of second surfaces are flat.

19. An optical distributor according to claim 18, wherein each of said plurality of second surfaces is inclined with respect to said first surface at an angle between 3° and 20°.

20. An optical distributor according to claim 18, wherein each of said plurality of second surfaces is inclined with respect to said first surface at an angle between 4° and 6°.

21. An optical distributor according to claim 14, having three or more second surfaces.

22. An optical distributor according to claim 21, wherein said first surface and each of said second surfaces are flat and each of said second surfaces is inclined with respect to said first surface at an angle between 3° and 20°.

23. An optical distributor according to claim 21, wherein said first surface and each of said second surfaces is flat and each of said second surfaces is inclined with respect to said first surface at an angle of between 4° to 6°.

* * * * *